Feb. 10, 1970  J. R. GARNETT ET AL  3,495,158
HARMONIC GENERATOR SYSTEM
Filed May 23, 1968
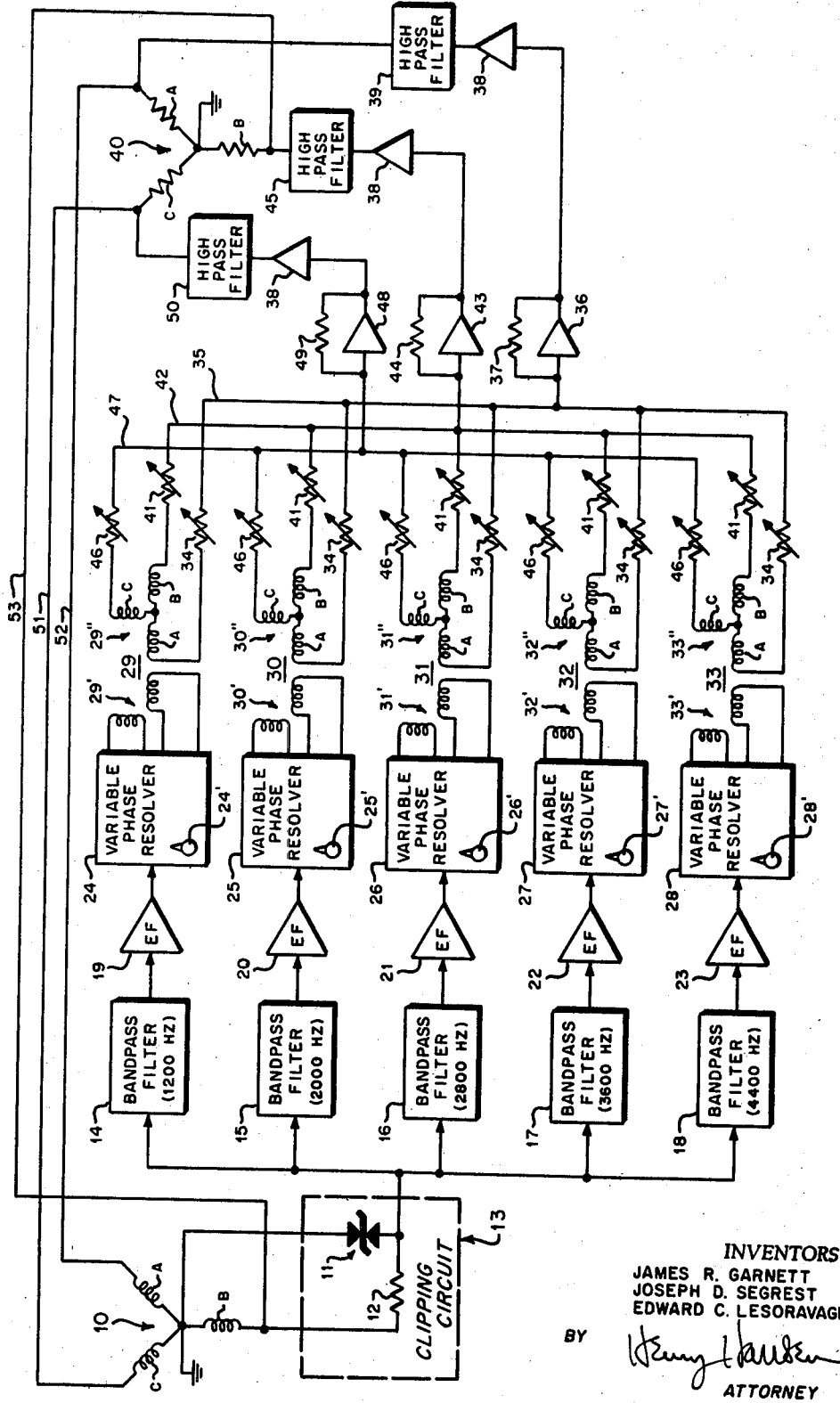
INVENTORS
JAMES R. GARNETT
JOSEPH D. SEGREST
EDWARD C. LESORAVAGE
BY
ATTORNEY

ABSTRACT OF THE DISCLOSURE

A system for generating polyphase odd harmonics of a fundamental frequency derived from but one phase of a high power polyphase source, both the magnitude and relative phase of the harmonics with respect to the fundamental being variable and controllable, for injection into a polyphase aircraft power system to both evaluate the response thereto and provide hamonics of equal magnitude but opposite phase relation to balance out inherent aircraft system harmonics.

BACKGROUND OF THE INVENTION

This invention relates to a system for generating variable and controllable odd harmonics from a fundamental frequency generated by a high power alternating current source. More particularly, the invention relates to a harmonic generating system wherein one phase of a polyphase power supply is utilized to provide composite, variable and controllable, polyphase, multiharmonic signals.

Multiple generators and/or multiple rotor generators connected in series have been utilized heretofore to produce controllable harmonic signals. However, these systems are disadvantageous as they are inefficient due to the series combination of windings and exhibit many regulation problems. In addition, for high power units the size, weight, and cost of these multi-machine systems become obvious restrictions and the complexity of the associated systems increases enormously with increase in power capability.

Aircraft power supply systems (which may be rated at 30 kva., for example) are known to be susceptible to harmonic distortion. In fact, prior testing and analysis of such aircraft systems has disclosed that malfunctions in the associated utilization equipment, as radar, communications systems, and others, have been induced or often caused by inherently generated odd harmonic signals.

Accordingly, it is desirable to provide harmonic generating test equipment for aircraft. This equipment must be capable of handling power in the 30 kva. range and should be of minimal size and weight so that it may be easily transported to the aircraft. Such an equipment may be utilized to externally inject odd harmonics and fundamental power into the aircraft power distribution system in a controllable fashion so as to isolate the harmonic or harmonics that are causing or inducing the malfunctions.

SUMMARY OF THE INVENTION

Accordingly, it is the general purpose of the present invention to provide an harmonic generator of relatively simple and light construction capable of handling received power on the order of 30 kva. from a polyphase source and for generating polyphase odd harmonics from but one phase of the polyphase source, both the magnitude and phase with respect to the fundamental of each of the harmonic signals being variable and controllable. The invention includes a clipping circuit for providing a square wave inherently rich in odd harmonics and a plurality of paralleled channels of active and passive elements, each channel including a filter for passing but one harmonic and a variable phase resolver connected to a Scott connected transformer for providing a three-phase single harmonic signal. Like phases of each single harmonic signal are summed to provide a single-phase multiharmonic signal. Individual, variable resistors are provided for controlling the amplitude of each of the single-phase, single-harmonics signals. The variable phase resolvers provide the aforementioned phase control.

BRIEF DESCRIPTION OF THE DRAWING

The single figure is a schematic block diagram of the harmonic generator in accordance with the invention.

DESCRIPTION OF THE PREFERRED EMBODIMENT

Referring now to the drawing, there is shown in the figure an alternating current (A.C.) polyphase source 10. As shown, the source comprises phase windings, A, B, and C connected in the Y configuration and grounded at the common or neutral point. This source, though generally shown here, may comprise the stator of a brushless alternator which is driven by an induction motor through an eddy current clutch drive. With such a motor-generator set, speed variations may be achieved by varying the excitation applied to the stationary clutch field. In addition, output voltage and frequency may be controlled by solid state voltage regulators and speed control circuitry.

The A.C. power source 10 provides a three-phase 400 Hz. output signal. However, if desired, voltage and frequency modulation may be produced by means of a modulation circuit to provide controllable voltage and frequency modulation from 380 Hz. to 420 Hz. this range being the general frequencies of operation of a typical aircraft power system.

One phase of the A.C. source 10 is connected across a matched pair of Zener diodes 11 and a ballast resistor 12. The combination of the matched Zener diode pair 11 and ballast resistor 12 comprise a clipping circuit 13 which functions to clip the A.C. signal produced by this one phase of the generator 10 to provide a square wave. In this manner, the odd harmonics of the signal in the one phase are produced since a square wave is inherently rich in odd harmonics. The output of the clipping circuit is fed to five paralleled channels, each of which contains a bandpass filter. Respectively, these bandpass filters are numbered 14, 15, 16, 17, and 18. Each of these filters has a 10% bandwidth respectively centered about the frequencies 1200 Hz., 2000 Hz., 2800 Hz., 3600 Hz., and 4400 Hz. As can be seen, these frequencies correspond respectively to the 3rd, 5th, 7th, 9th, and 11th harmonics of the 400 Hz. fundamental. Each bandpass filter is electrically connected to a respective emitter follower 19, 20, 21, 22, or 23. Each of the respective emitter followers is, in turn, electrically connected to a respective variable phase generator or resolver 24, 25, 26 27, 28, each respectively having manual control knobs 24', 25', 26', 27' and 28'. Each variable phase resolver is designed for the specific harmonic frequency it passes. In addition, each provides a two-phase output signal 90° apart with plus or minus 0.1° displacement therebetween. This two-phase output signal may itself be varied through 360° with respect to the input fundamental frequency. Each of the emitter followers 19–23, inclusive, function to provide amplitude control voltage gain and impedance matching between filters 14–18, inclusive, and variable phase resolvers 24–28, inclusive.

Each respective variable resolver is connected to a respective Scott connected transformer 29, 30, 31, 32, and 33. Each transformer, respectively, has primary windings 29', 30', 31', 32', and 33' and secondary windings 29", 30", 31", 32", and 33". Each Scott connected transformer functions to convert into three-phase signals the two-phase resolver signals for each of the harmonics generated. The outputs of each Scott transformer are derived from the respective secondaries, each of which comprises phases A, B, and C. Each phase A is connected to one side of a respective variable resistor 34. Each of the resistors 34 is then connected together at their respective other sides to a common bus 35. Bus 35 is connected to a summing amplifier 36 having a feedback resistor 37 thereacross. Summing amplifier 36 is connected at its output to a power amplifier 38 which is, in turn, connected at its output to a high-pass filter 39. The output of the high-pass filter 39 is connected to phase A of a polyphase load 40, which may be an aircraft power system and is here shown as a Y-connected resistive load having three phases A, B, and C and grounded at the common junction of the phases.

Similarly, each phase B of each Scott transformer is connected to a common bus 42 through a respective variable resistor 41 and from there connected to a summing amplifier 43 having feedback resistor 44 connected thereacross. The summing amplifier 43 is connected at its output to a like power amplifier 37, the output of which is connected to a high-pass filter 45. The output of high-pass filter 45 is connected to the B-phase of the polyphase load 40.

The C-phase of each respective Scott transformer is connected through a respective variable resistor 46 to the common bus 47. Bus 47 is connected to a summing amplifier 48 having thereacross feedback resistor 49. The output of summing amplifier 48 is connected to a like power amplifier 38, the output of power amplifier 38 being connected to a high-pass filter 50. High-pass filter 50 is connected at its output to the C-phase of the polyphase load 40. In addition, the C-phase of the alternating current source 10 is connected to the C-phase of the polyphase load 40 by the line 51. Similarly, the A-phase of the source 10 is connected to the A-phase of the load 40 by the line 52 and the B-phase of the source 10 is connected to the B-phase of the load 40 by the line 53.

The operation of the system will now be described. The A.C. source 10 may provide a 30 kilowatt, nominal 400 Hz. signal having a line to neutral voltage of 115 volts and a line to line voltage of 220 volts. One phase of this signal, here phase B, is clipped by clipping circuit 13 to produce the third, fifth, seventh, ninth and eleventh harmonics thereof. The aforementioned prior testing and analysis has shown that aircraft power systems such as load 40 are most susceptible to these harmonics. However, it is noted that the mere addition of channels having filters with appropriate bandwidths and center frequencies will provide even higher order odd harmonics. It is noted, however, that the angle of the clipping circuit should be such so as to maximize the highest order harmonic, due to the fact that the higher the order of the harmonic, the lower is the harmonic amplitude. By a Fourier analysis of the waveform across Zener diodes 11, and considering the voltages, frequency, power requirements, and harmonics above, it was found that a matched pair of 22-volt Zener diodes and a 5-ohm, 250-watt ballast resistor performed satisfactorily.

The square wave signal produced by clipping circuit 13 is fed to the bandpass filters 14–18, inclusive. Bandpass filter 14, tuned to 1200 Hz., passes the third harmonic only, all other harmonics being beyond the bandwidth of the filter. Filter 14 has a 10% bandwidth so that it may pass the third harmonic when the fundamental frequency varies between 380 Hz. to 420 Hz. In a similar manner, bandpass filter 15 passes the fifth harmonic, bandpass filter 16 passes the seventh harmonic, bandpass filter 17 passes the ninth harmonic, and bandpass filter 18 passes the eleventh harmonic. Each of these harmonic signals is then passed by respective impedance matching emitter followers 19–23, inclusive, and fed respectively to variable phase resolvers 24, 25, 26, 27, and 28. Phase resolver 24 converts the single-phase third harmonic signal into a two-phase harmonic signal, the relative displacement of this signal with respect to the fundamental being variable through 360°. Resolver 24 applies this two-phase signal to the primary 29' of Scott connected transformer 29. In like manner, the single-phase fifth harmonic signal is converted by phase resolver 25 to a two-phase fifth harmonic signal and applied to the primary 30' of Scott transformer 30. Similarly, phase resolvers 26–28, inclusive, provide two-phase signals of the seventh, ninth and eleventh harmonic, respectively, to the primaries 31', 32', and 33'. The signals thus appearing on the primaries of the respective Scott connected transformers are reflected into the secondaries thereof and are converted into three-phase harmonic signals. Thus, each respective secondary winding of each Scott connected transformer 29–33, inclusive, provides a three-phase harmonic signal. Secondary 29" provides a three-phase third harmonic signal. Secondary 30" provides a three-phase fifth harmonic signal. Similarly, secondaries 31"–32", inclusive, respectively provide three-phase harmonic signals of the seventh, ninth, and eleventh type, all of these signals having been derived from but a single phase of the polyphase source 10. In addition, the relative displacement of these signals with respect to the fundamental may be varied through 360° merely by varying resolvers 24–28, inclusive.

Like phases of the respective Scott connected transformers are connected together, through appropriate variable resistors, and the signals produced thereby are summed by appropriate summing amplifiers. Thus, all of the A-phases are connected through variable resistors 34 to the common bus 35 and fed to the summing amplifier 36. This amplifier thus receives a composite single-phase signal comprising the third, fifth, seventh, ninth and eleventh harmonics of the fundamental frequency. In like manner summing amplifier 43 receives a second composite single-phase signal comprising the third, fifth, seventh, ninth, and eleventh harmonics. And the summing amplifier 48 receives yet a third composite single-phase harmonic signal comprising the third, fifth, seventh, ninth, and eleventh harmonics of the fundamental frequency, each composite signal, however, being 120° out of phase with each of the others. Each of these composite, single-phase, multi-harmonic signals are amplified by power amplifiers 38 and respectively fed and passed by high-pass filters 39, 45, and 50 to phases A, B, and C, respectively, of the polyphase load 40. The high-pass filters 39, 45, and 50 are each tuned to pass signals having a frequency equal to and greater than the third harmonic of the nominal fundamental 400 Hz. frequency thereby preventing the fundamental frequency from the source 10 to load 40 from being fed back into the harmonic generating system.

It should now be apparent that merely by varying the variable resistors 34, 41, and 46, either singly or in any combination thereof, various harmonics per load phase may be either injected or excluded. Thus, increasing the resistance of variable resistor 34 in phase A of Scott connected transformer 29, for example, reduces the amplitude of the third harmonic appearing in phase A of the load 40. Similarly, the phase of this third harmonic may be varied with respect to the fundamental frequency by manually varying the knob 24' of the resolver 24. Thus, if it is desired to eliminate an inherent third harmonic of the fundamental frequency appearing in the A-phase of the load 40, it is necessary only to set the variable resistor 34 in phase A of Scott connected transformer 29 such that the magnitude there of is identical with that of the inherent harmonic in phase A of the load 40 and, further, vary the phase thereof by varying the resolver 24 until it is 180° out of phase with the inherent signal. In this manner the vectorial sum of the two signals will be zero and the inherent signal will be canceled out.

Many modifications and variations of the present invention are possible in the light of the above teachings. For example, the variable phase resolvers may be set at arbitrary phase angles to inject into the load 40 an harmonic signal of arbitrary phase which will automatically be vectorially summed by the load 40 with the inherent harmonics therein thereby yielding a composite vectorially summed signal. In this way random signals can be generated within the load and the performance thereof, with respect to these random signals, may be evaluated. In addition, once inherent harmonics have been isolated, the potentiometers and variable phase resolvers may be set such that harmonics of equal magnitude but 180° out of phase therewith may be injected into the aircraft power distribution system to eliminate them.

What is claimed is:

1. An harmonic generator system comprising:
   first means for providing a composite single phase signal including a fundamental frequency signal and odd ordered harmonic frequency signals;
   filter means connected with said first means for passing selected ones of said single phase odd ordered harmonic frequency signals;
   second means connected with said filter means for converting each of said single phase odd ordered harmonic frequency signals into polyphase odd ordered harmonic frequency signals; and
   means for summing like phases of each of said polyphase odd ordered harmonic frequency signals to provide a composite single phase multi-harmonic frequency signal.

2. An harmonic generator system as defined in claim 1 wherein said second means includes:
   phasing means for varying and converting the phase of said single phase odd harmonic frequency signals into two phase odd harmonic frequency signals; and
   three phase means connected with said phasing means for converting said two phase odd harmonic frequency signals into three phase odd harmonic frequency signals.

3. An harmonic generator system as defined in claim 2 wherein said second means further includes:
   means connected with said three phase means for varying selected amplitudes of said polyphase odd harmonic frequency signals.

4. An harmonic generator system as defined in claim 3 wherein said second means further includes:
   means interposed between said filter means and said phasing means to match the impedance of said filter means with said phasing means.

5. An harmonic generator as defined in claim 4 further including:
   high-pass filter means connected with said means for summing for permitting the passage of said composite single phase multi-harmonic frequency signal to the exclusion of said fundamental frequency signal.

6. An harmonic generator system as defined in claim 1 wherein said first means includes:
   double based Zener diode means;
   ballast resistor means, said resistor means connected in series circuit relation with said diode means thereby to provide a circuit for clipping a received fundamental frequency signal.

7. An harmonic generator system according to claim 6 wherein said first means further includes:
   polyphase high power source means having only one phase thereof connected across said first means to supply alternating current thereto.

8. An harmonic generator system according to claim 7 further including:
   high-pass filter means connected to said means for summing for permitting the passage of said composite single phase multi-harmonic frequency signal to the exclusion of said fundamental signal; and
   polyphase load means connected with said high-pass filter means, and said polyphase source means, whereby said fundamental frequency signal and said composite single phase multi-harmonic frequency signals are caused to flow therethrough.

References Cited

UNITED STATES PATENTS

| 1,446,752 | 2/1923 | Kendall | 328—18 |
| 1,519,619 | 12/1924 | Horton | 328—18 |
| 1,559,869 | 11/1925 | Hartley | 328—18 |
| 2,303,511 | 12/1942 | Tawney | 328—16 |
| 3,296,517 | 1/1967 | Routh et al. | 321—1 |

LEE T. HIX, Primary Examiner

W. M. SHOOP, Jr., Assistant Examiner

U.S. Cl. X.R.

328—16, 18